(12) United States Patent
Chang et al.

(10) Patent No.: US 9,697,148 B2
(45) Date of Patent: Jul. 4, 2017

(54) APPARATUS AND METHOD FOR MANAGING MEMORY

(71) Applicant: MStar Semiconductor, Inc., Hsinchu Hsien (TW)

(72) Inventors: Yung Chang, Hsinchu (TW); Chen-Nan Lin, Taipei (TW); Chung-Ching Chen, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 29 days.

(21) Appl. No.: 14/876,043

(22) Filed: Oct. 6, 2015

(65) Prior Publication Data

US 2016/0124648 A1     May 5, 2016

(30) Foreign Application Priority Data

Oct. 13, 2014  (TW) .............................. 103135347 A

(51) Int. Cl.
*G11C 8/00*       (2006.01)
*G06F 13/16*      (2006.01)

(52) U.S. Cl.
CPC ................................ *G06F 13/1689* (2013.01)

(58) Field of Classification Search
CPC .............................. G11C 8/00; G06F 13/1689
USPC ........................................................ 365/233.1
See application file for complete search history.

(56) References Cited

U.S. PATENT DOCUMENTS

| 8,659,959 | B2* | 2/2014 | Kim | ................... | G06F 11/1028 365/189.07 |
| 2012/0300563 | A1* | 11/2012 | Kim | ................... | G06F 11/1028 365/193 |
| 2012/0300570 | A1* | 11/2012 | Kim | ................... | G06F 11/1028 365/222 |

FOREIGN PATENT DOCUMENTS

| CN | 1734668 A | 2/2006 |
| TW | 200921671 A | 5/2009 |

OTHER PUBLICATIONS

Taiwan Office Action, Sep. 8, 2015, 8 pages.

* cited by examiner

*Primary Examiner* — Harry W Byrne
(74) *Attorney, Agent, or Firm* — Edell, Shapiro & Finnan, LLC

(57) ABSTRACT

An apparatus for managing a memory having a plurality of command/address pins is provided. The apparatus includes a command generating module and a control module. The command generating module generates a set of target commands. The set of target commands include a plurality of command groups. Each of the command groups corresponds to at least one command/address pin of the plurality of command/address pins. It is known that the memory accesses the set of target commands from the plurality of command/address pins at a target time point. The control module controls the command groups to have different transition times prior to the target time points when the command groups are transmitted on the plurality of command/address pins.

3 Claims, 7 Drawing Sheets

| command | CKE | | CS_N | CA0 | CA1 | CA2 | CA3 | CA4 | CA5 | CA6 | CA7 | CA8 | CA9 | CK_t |
|---|---|---|---|---|---|---|---|---|---|---|---|---|---|---|
| | CK_t(n-1) | CK_t(n) | | | | | | | | | | | | |
| activate | H | H | L | L | H | R8 | R9 | R10 | R11 | R12 | BA0 | BA1 | BA2 | ↷ |
| | | | X | R0 | R1 | R2 | R3 | R4 | R5 | R6 | R7 | R13 | R14 | ↷ |
| write | H | H | L | H | L | L | RFU | RFU | C1 | C2 | BA0 | BA1 | BA2 | ↷ |
| | | | X | AP | C3 | C4 | C5 | C6 | C7 | C8 | C9 | C10 | C11 | ↷ |
| read | H | H | L | H | L | H | RFU | RFU | C1 | C2 | BA0 | BA1 | BA2 | ↷ |
| | | | X | AP | C3 | C4 | C5 | C6 | C7 | C8 | C9 | C10 | C11 | ↷ |
| no-operation | H | H | H | | | | | | X | | | | | ↷ |
| | | | X | | | | | | X | | | | | ↷ |
| power off | H | L | H | | | | | | X | | | | | ↷ |
| | | | X | | | | | | X | | | | | ↷ |

FIG. 1(A) (prior art)

APPARATUS AND METHOD FOR MANAGING MEMORY

This application claims the benefit of Taiwan application Serial No. 103135347, filed Oct. 13, 2014, the subject matter of which is incorporated herein by reference.

BACKGROUND OF THE INVENTION

Field of the Invention

The invention relates to a technology for managing commands of a memory.

Description of the Related Art

Memories are an essential element in many electronic products. Low power double data rate 2/3 (LPDDR2/3) memories, featuring low power consumption and high reliability, are extensively applied in portable consumer electronic products.

An LPDDR2/3 memory has ten command/address pins (CA0 to CA9) for receiving commands including reading, writing and pre-charging issued from an external control circuit and addresses associated with these commands. To increase an operation speed, an LPDDR2/3 memory is designed to access signals from the pins CA0 to CA9 at both a rising edge and a falling edge of a clock signal CK_t. FIG. 1(A) shows a partial mapping table of LPDDR specifications. In the table, the symbol H represents a high level voltage, L represents a low level voltage, and X represents a negligible voltage status. In addition to the command/address pins CA0 to CA9, an LPDDR2/3 memory further includes two pins for transmitting control signals—a clock enable pin CKE and a chip select pin CS_N. Taking an activate (Act) command for example, assuming that the signal statuses of the clock enable pin CKE at a time pint $CK\_t(n-1)$ and a time point $CK\_t(n)$ are both H, and the memory respectively accesses L, L and H from the chip select pin CS_N and the command/address pin CA0 and CA1 at a rising edge of the clock signal CK_t, the memory determines that an external control circuit issues an Act command. Meanwhile, the information that the memory accesses from the command/address pins CA2 to CA9 is a part of designated addresses of a memory area to be activated. When a falling edge of the clock signal CK_t later appears, the memory may access the other part of address information from the command/address pins CA0 to CA9.

For a no-operation (NOP) command, assuming that the signal statuses of the clock enable pin CKE at the time point $CK\_t(n-1)$ and $CK\_t(n)$ are both H, and the memory accesses H from the chip select pin CS_N at a rising edge of the clock signal CK_t, the memory may determine that the external control circuit issues a NOP command. In such situation, the memory may omit the signals accessed at the same time from the command/address pins CA0 to CA9, and may also omit the signals on the command/address pins CA0 to CA9 when a falling edge of the clock signal CK_t later appears.

FIG. 1(B) shows an example of a possible timing diagram of pins of an LPDDR2/3 memory in actual operations. A clock signal CK_t is a periodical square wave signal having a duty cycle of substantially equal to 50%, and it is assumed that the cycle length is T. In this example, an external control circuit sequentially issues a no-operation (NOP) command, an Act command, a NOP command, a read (RD) command, and a longer NOP command via the command/address pins CA0 to CA9. As seen from FIG. 1(B), to allow the LPDDR2/3 memory to correctly access the first part of the Act command from the command/address pins CA0 to CA9 at a rising edge of the clock signal CK_t at a time point t3, the external control circuit changes voltage statuses of the command/address pins CA0 to CA9 at an intermediate time point between the time points t2 and t3, such that the signals on the command/address pins CA0 to CA9 complete the transition before the time point t3. Between time points t3 and t4, the external control circuit causes the signals on the command/address pins CA0 to CA9 to complete the transition, so that the LPDDR2/3 memory is allowed to correctly access the second part of the Act command from the command/address pins CA0 to CA9 at a falling edge of the clock signal CK_t at the time point t4.

Similarly, to allow the LPDDR2/3 memory to correctly access the first part of the RD command from the command/address pins CA0 to CA9 at a rising edge of the clock signal CK_t at the time point t7, the external control circuit changes the voltage statuses of the command/address pins CA0 to CA9 at an intermediate point between the time points t6 and t7 to cause the signals on the command/address pins CA0 to CA9 to complete the transition before the time point t7. Between time points t7 and t8, the external control circuit causes the signals on the command/address pins CA0 to CA9 to complete the transition, so that the LPDDR2/3 memory is allowed to correctly access the second part of the RD command from the command/address pins CA0 to CA9 at a falling edge of the clock signal CK_t at the time point t8.

The above method suffers from one drawback. That is, each time when a new command appears, multiple signals among the signals transmitted on the command/address pins CA0 to CA9 may transition at a same time point. For example, there are nine signals concurrently in transition at the intermediate time point between the time points t2 and t3, and there are ten signals concurrently in transition at the intermediate time point between the time points t6 and t7. These signals concurrently in transition may interfere one another and result in poor signal quality. Further, these signals concurrently in transition may cause a quite large instantaneous current/voltage fluctuation, or cause a high power demand during the instant of the transition.

On the other hand, as the LPDDR2/3 memory accesses data at both a rising edge and a falling edge of the clock signal CK_t, the aperture of an eye diagram of accessed results can be limited, which may lead to possible misjudgment on the accessed results. Taking the command/address pin CA2 in FIG. 1(B) for example, the voltage changes from low to high between the time points t2 and t3, and changes from high to low between the time points t3 and t4. If the transition time of this signal is slightly delayed or brought forward due to various non-ideal factors or the clock signals at transmitter and receiver ends are not ideally synchronized, the LPDDR2/3 memory may access an incorrect voltage status, leading to a misjudgment on the command issued from the external control circuit.

SUMMARY OF THE INVENTION

The invention is directed to an apparatus and method for managing a memory. Without affecting an operation result of an LPDDR memory, by appropriately advancing or delaying the transition times of all or a part of command/address signals, the apparatus and method of the present invention is capable of solving the above issues.

An apparatus for managing a memory having a plurality of command/address pins is provided according to an embodiment of the present invention. The apparatus includes a command generating module and a control module. The command generating module generates a set of target commands including a plurality of command groups. Each of the command groups corresponds to at least one command/address pin of the plurality of command/address pins. It is known that the memory accesses the set of target commands from the plurality of command/address pins at a target time point. The control module controls the command groups to respectively transition at different time points prior to the target time point when the command groups are transmitted on the plurality of command/address pins.

A method for managing a memory having a plurality of command/address pins is provided. A set of target commands including a plurality of command groups are generated. Each of the command groups corresponds to at least one command/address pin of the plurality of command/address pins. It is known that the memory accesses the set of target commands from the plurality of command/address pins at a target time point. The command groups are controlled to respectively transition at different time points prior to the target time point when the command groups are transmitted on the plurality of command/address pins.

An apparatus for managing a memory having at least one command/address pin is provided. The apparatus includes a command generating module and a control module. The command generating module generates a target command that is to be provided to the memory through at the least one command/address pin. The control module advances or delays a transition time of the at least one command/address pin for transmitting the target command.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 1(A) is a partial command mapping table of LPDDR2/3 specifications;

DETAILED DESCRIPTION OF THE INVENTION

Figure 2:
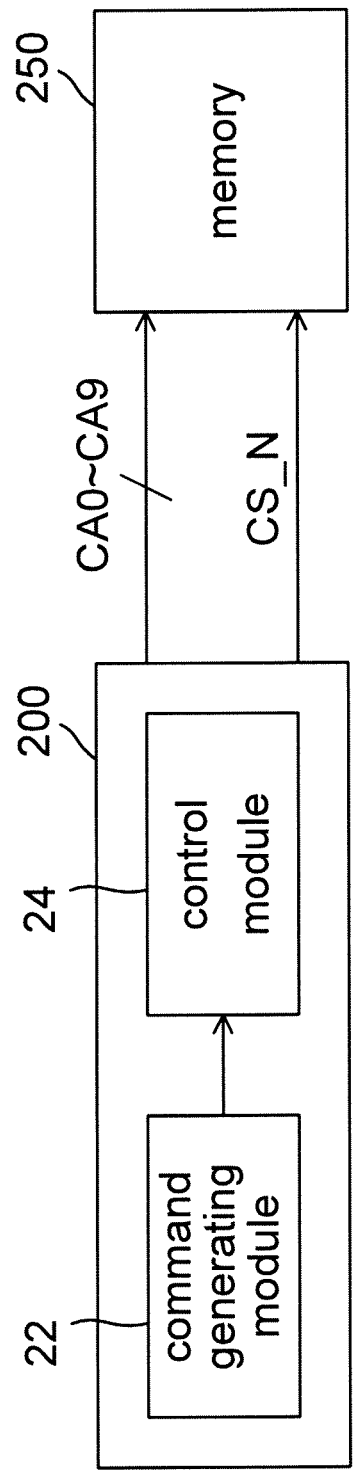
FIG. 2 is a function block diagram of an apparatus for managing a memory according to an embodiment of the present invention.

FIG. 2 shows a function block diagram of an apparatus for managing a memory according to an embodiment of the present invention. An apparatus 200 for managing a memory is applied to a memory 250 having a plurality of command/address pins. In the description below, the memory 250 is exemplified by a low power double data rate 2/3 (LPDDR2/3) memory having ten command/address pins CA0 to CA9. One person skilled in the art can understand that the concept of the present invention is not limited to the above example It should be noted that, other connecting pins (e.g., data transmission pins) may be disposed between the apparatus 200 and the memory 250, and are omitted in the diagrams due to low relevancy with the concept of the present invention.

The apparatus 200 for managing a memory includes a command generating module 22 and a control module 24. The command generating module 22 generates a set of target commands, which include the ten command signals provided to the memory 250 through the command/address pins CA0 to CA9, respectively. These ten command signals are divided into a plurality of command groups, with associated distribution rules to be later described. For example, these ten command signals are divided into three command groups—a first command group including three command signals transmitted through the pins CA0 to CA2, a second command group including three command signals transmitted through the pins CA3 to CA5, and a third command group including four command signals transmitted through the pins CA6 to CA9.

Figure 3:
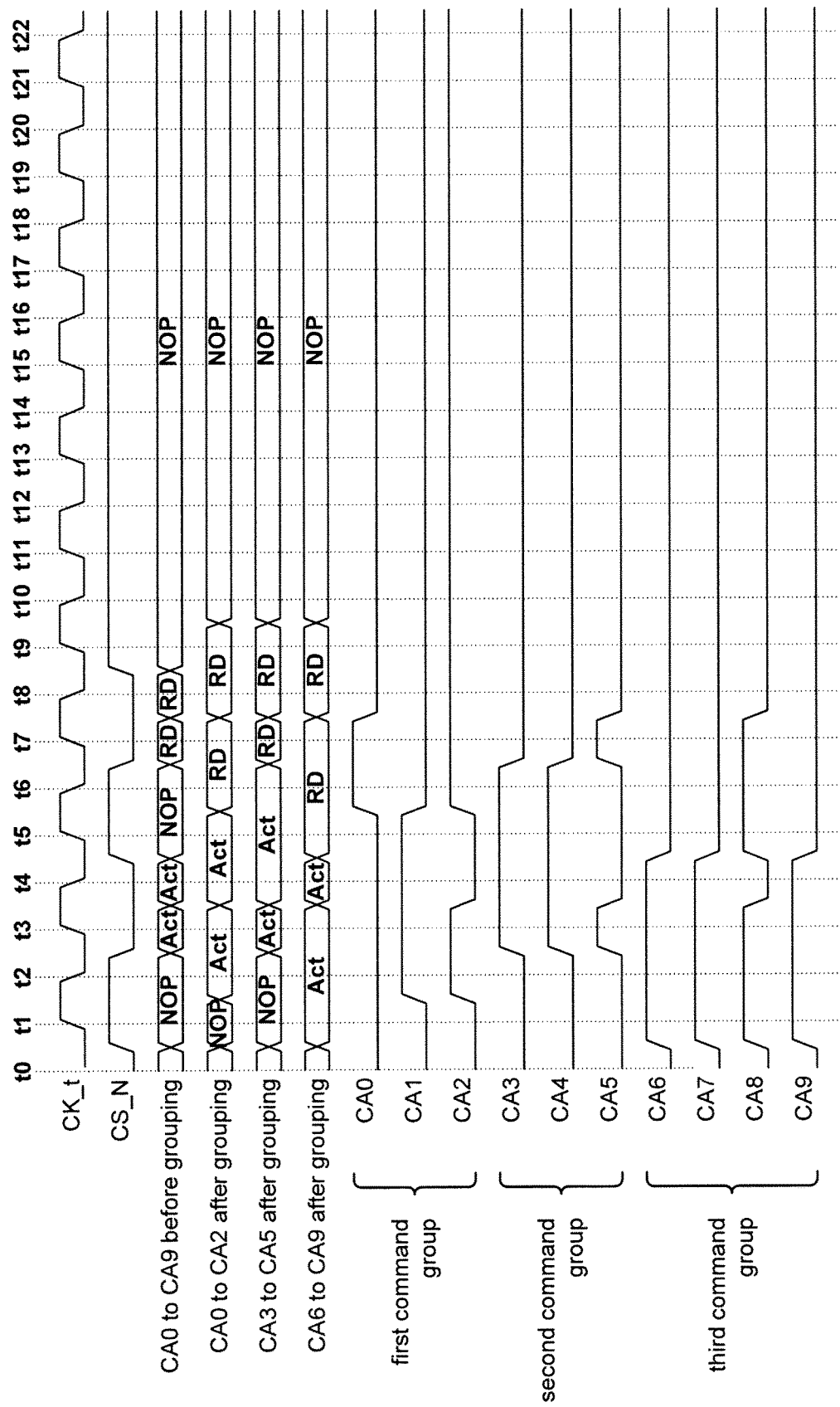
FIG. 3 is an example of transition time distribution provided by an apparatus for managing a memory according to an embodiment of the present invention.

It is known that the memory 250 accesses the set of target commands from the command/address pins CA0 to CA9 at a target time point. The control module 24 determines whether the set of target commands directly follow a no-operation command (NOP). If so, the control module 24 causes the command groups to respectively transition at different time points prior to the target time point when the command groups are transmitted on the command/address pins CA0 to CA9. In certain situations, a NOP command exists between two target commands. Thus, the control module 24 does not need to determine whether the target commands directly follow a NOP command. FIG. 3 shows an example of transition time distribution provided by the control module 24. Identical to the situations in FIG. 1(B), the apparatus 200 for managing a memory in this example sequential issues a NOP command, an Act command, a NOP command, a read (RD) command, and a longer NOP command. For comparison purposes, the waveforms of the signals transmitted through the command/address pins CA0 to CA9 are also depicted side by side in FIG. 3 (denoted as CA0 to CA9 before grouping).

First, the Act command may be regarded as a set of target commands including a first-part data (to be sampled by a rising edge) and a second-part data (to be sampled by a falling edge). It is known that the memory 250 accesses the first-part data at a target time point t3, and accesses the second-part data at a target time point t4. It is seen from FIG. 1(B), in the prior art, the command/address pins CA0 to CA9 concurrently transition at three time points between the time points t2 and t3, between the time points t3 and t4, and between the time points t4 and t5. In this embodiment, it is seen that the first-part data of the Act command directly follows a NOP command, i.e., no command is transmitted before the Act command. Thus, the control module 24 may cause the first command group, the second command group and the third command group to respectively transition at different time points prior to the target time point t4. In the embodiment, the control module 24 sets the first command group to transition between the time points t1 and t2, sets the second command group to transition between the time points t2 and t3, and sets the third command group to transition between the time points t0 and t1, such that the first-part data of the Act command can be correctly accessed at the time point t3. Next, the control module 24 causes the first command group, the second command group and the third command group to concurrently transition between the time points t3 and t4, such that the second-part data of the Act command can be correctly accessed at the time point t4. The second-part data of the Act command is directly followed by another NOP command, and the control module 24 may cause the first command group, the second command group and the third command group to respectively transition at different time points subsequent to the target time point t4. In this embodiment, the control module 24 sets the first command group to transition between the time points t5 and t6, sets the second command group to transition between the time points t6 and t7, and sets the third command group to transition between the time points t4 and t5. In another embodiment, the transition time at which when the second-part data of the Act command ends may be determined by a next operation command (e.g., an Act command, a RD command or a write (WR) command). It should be noted that, as the memory 250 originally omits the signals transmitted on the command/address pins CA0 to CA9 in a no-operation period, bringing the transition times of the first command group and the third command group does not affect the overall operation result of the memory 250.

Similarly, the RD command may be regarded as a set of target commands including a first-part data (to be sampled by a rising edge) and a second-part data (to be sampled by a falling edge). It is known that the memory 250 accesses the set of target commands at a target time point t7. Observed from CA0 to CA9 before grouping, the first-part data of the RD command directly follows a NOP command. Thus, the control module 24 causes the first command group, the second command group and the third command group to respectively transition at different time points prior to the target time point t7 to accordingly reduce the number of signals concurrently in transition. Similarly, the second-part data of the RD command is directly followed by another NOP command, and the control module 24 may cause the first command group, the second command group and the third command group to respectively transition at different time points subsequent to the target time point t8.

Figure 1B:
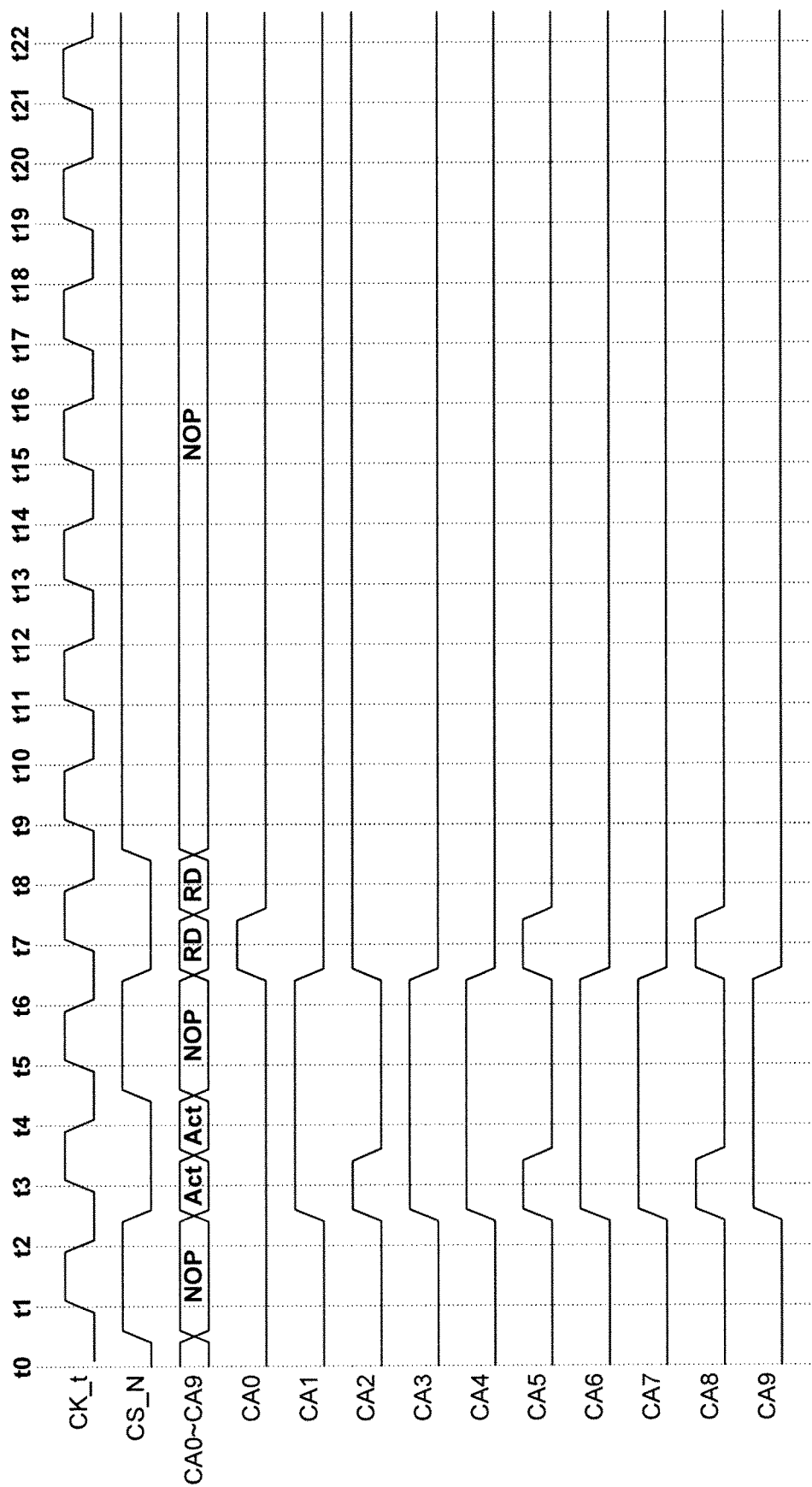
FIG. 1(B) is an example of a possible timing diagram of pins of an LPDDR2/3 in actual operations.

By comparing FIG. 1(B) and FIG. 3, it is seen that, an advantage of grouping the target command and designating different transition times is that, the number of signals transition at a same time point is significantly reduced, hence preventing the issue caused by multiple signals in concurrent transition of the prior art.

In practice, the control module 24 may be implemented by various types of control and processing platforms, including fixed and programmable logic circuits, e.g., programmable logic gate arrays, application-specific integrated circuits, microcontrollers, microprocessors, and digital signal processors. Further, the control module 24 may also be designed to complete multiple tasks through executing a processor command stored in a memory. One person skilled in the art can understand that, the control module 24 and the command generating module 22 may also be integrated into one single module. It should be noted that, as the control signal issued to the memory 250 is generated by the apparatus 200 for managing a memory, whether each target command directly follows a no-operation period is apparently known to the control module 24.

It should be noted that, the method for grouping the command signals (including the number of signals and signal distribution) is not limited to the example in FIG. 3. For example, ten command signals may also be divided into two command groups—a first command group including five command signals transmitted through the pins CA0 to CA4, and a second command group including five command signals transmitted through the pins CA5 to CA9. It can be understood that, the number of groups of the command signals may get larger as the no-operation period prior to the target command gets longer.

In the example in FIG. 3, the transition times of the command groups are spaced by substantially one-half duty cycle of the clock signal CK_t. In practice, the distribution method of the transition times that the control module 24 designates to the command groups is not limited to the example in FIG. 3. Given the transition times of the command groups are spaced far enough, the issue caused by multiple signals concurrently in transition can be prevented.

Figure 4:
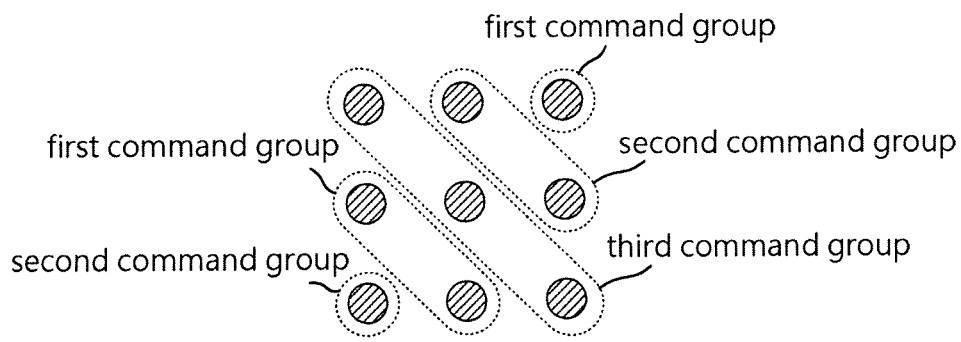
FIG. 4 is a feasible method for grouping pins of the present invention.

In one embodiment, the grouping method for the plurality of command groups is predetermined according to physical position configuration of the plurality of command/address pins. For example, the command/address pins with physical addresses that are upper, lower, left and right adjacent may be designated to different command groups to reduce interference on one another. FIG. 4 shows a feasible grouping method for an example of nine pins in an array arrangement.

Figure 5:
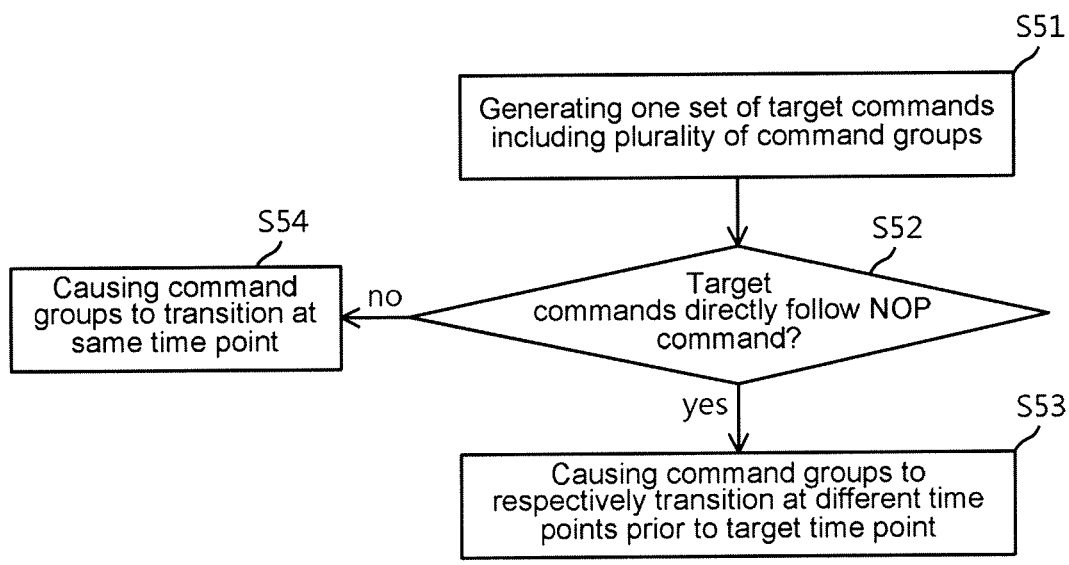
FIG. 5 is a flowchart of a method for managing a memory according to an embodiment of the present invention.

FIG. 5 shows a flowchart of a method for managing a memory having a plurality of command/address pins according to another embodiment of the present invention. In step S51, a set of target commands are generated. The set of target commands include a plurality of command groups. Each of the command groups includes at least one command signal. It is known that the memory accesses the set of target commands from the plurality of command/address pins at a target from point. In step S52, it is determined whether the set of target commands directly follow a NOP command. When a determination result of step S52 is affirmative, step S53 is performed to control the command groups to respectively transition at different time points prior to the target time point when the command groups are transmitted on the command/address pins. Conversely, when the determination result of step S52 is negative, step S54 is performed to cause all of the command groups to transition at a same time point prior to the target time point. In certain situations, a NOP command exists between two target commands, and so steps S52 and S53 may be omitted, and step S54 may be directly performed.

One person skilled in the art can understand that, operation variations given in the description associated with apparatus 200 for managing a memory can be applied to the method for managing a memory in FIG. 5, and such repeated details shall be omitted herein.

Figure 6:
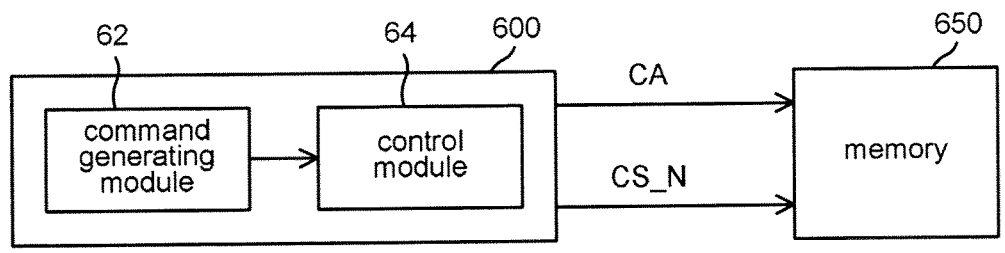
FIG. 6 is a function block diagram of an apparatus for managing a memory according to another embodiment of the present invention.
Figure 7:
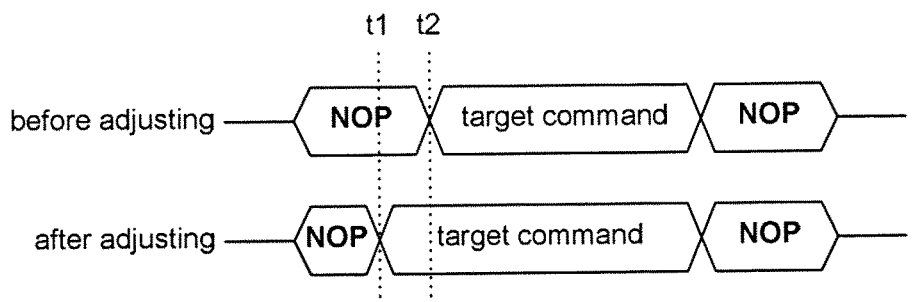
FIG. 7 is another example of transition time distribution provided by an apparatus for managing a memory according to an embodiment of the present invention.

FIG. 6 shows a function block diagram of an apparatus for managing a memory having at least one command/address pin according to another embodiment of the present invention. An apparatus 600 for managing a memory includes a command generating module 62 and a control module 64. The command generating module 62 generates a target command to be provided to the memory 650 through the at least one command/address pin. The control module 64 determines whether the target command directly follows a NOP command. If so, the control module 64 advances a transition time for transmitting the target command through the at least one command/address pin. FIG. 7 shows a converted timing diagram for illustrating the above concept. In FIG. 7, the target command directly follows a NOP command. Thus, the control module 64 may advance the transition time for transmitting the target command from the time point t2 to the time point t1. An advantage of such approach is that, the aperture of an eye diagram of access results of the target command accessed by the memory 650 can be enlarged to reduce the possibility of misjudging the accessed results.

Figure 8:
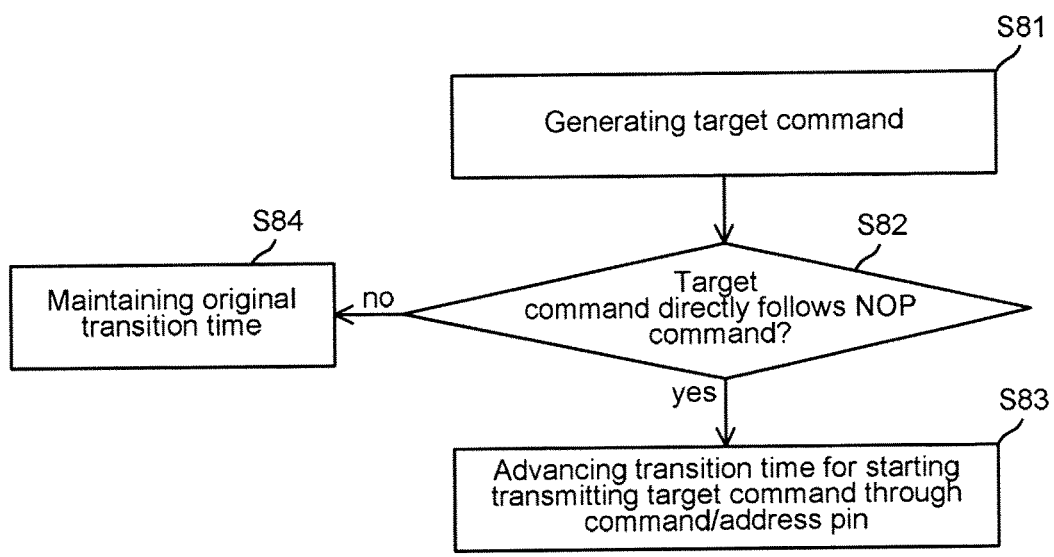
FIG. 8 is a flowchart of a method for managing a memory according to another embodiment of the present invention.

FIG. 8 shows a flowchart of a method for managing a memory having at least one command/address pin according to another embodiment of the present invention. In step S81, a target command to be provided to the memory through the at least one command/address pins is generated. In step S82, it is determined whether the target command directly follows a NOP command. When a determination result of step S82 is affirmative, step S83 is performed to advance a transition time for starting transmitting the target command through the at least one command/address pin. Conversely, when the determination result of step S82 is negative, step S84 is performed to maintain the original transition time.

Figure 9:
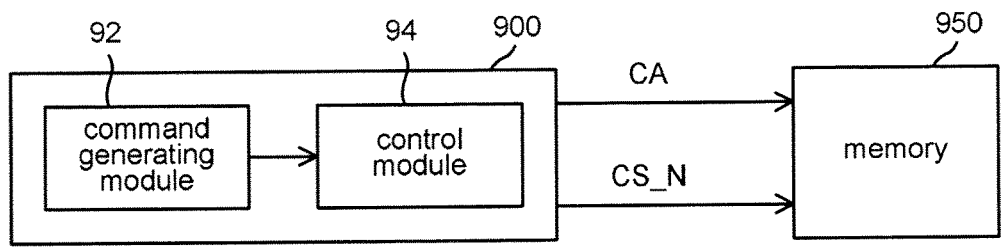
FIG. 9 is a function block diagram of an apparatus for managing a memory according to another embodiment of the present invention.
Figure 10:
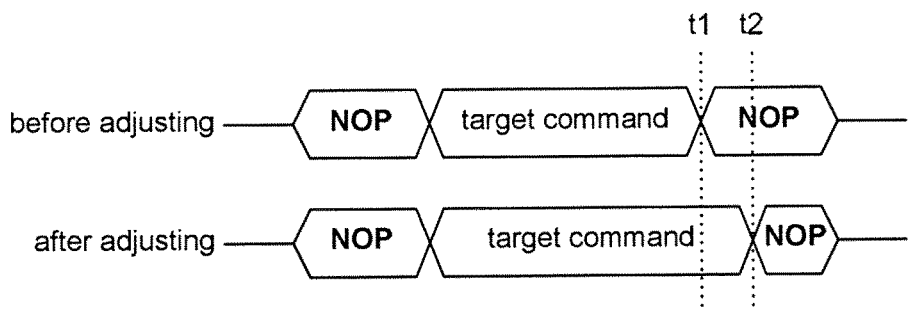
FIG. 10 is another example of transition time distribution provided by an apparatus for managing a memory according to an embodiment of the present invention.

FIG. 9 shows a function block diagram of an apparatus for managing a memory having at least one command/address pin according to another embodiment of the present invention. An apparatus 900 for managing a memory includes a command generating module 92 and a control module 94. The command generating module 92 generates a target command to be provided to the memory 650 through the at least one command/address pin. The control module 94 determines whether the target command is directly followed by a NOP command. If so, the control module 94 delays a transition time for stopping transmitting the target command through the at least one command/address pin. FIG. 10 shows a converted timing diagram for illustrating the above concept. In FIG. 10, the target command is directly followed by a NOP command. Thus, the control module 94 may delay the transition time for stopping transmitting the target command from the time point t1 to the time point t2. An advantage of such approach is that, the aperture of an eye diagram of access results of the target command accessed by the memory 950 can be enlarged to reduce the possibility of misjudging the accessed results.

Figure 11:
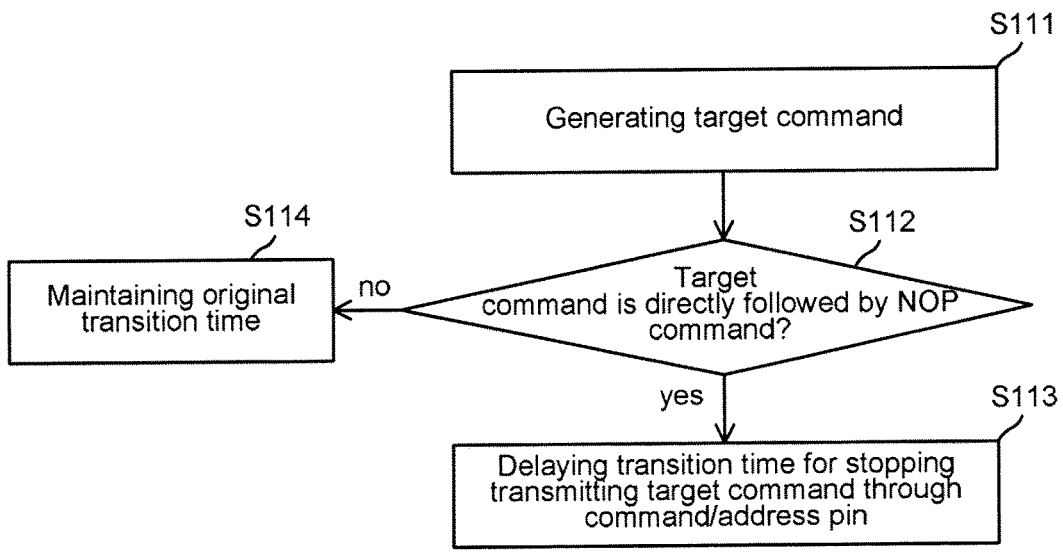
FIG. 11 is a flowchart of a method for managing a memory according to another embodiment of the present invention.

FIG. 11 shows a flowchart of a method for managing a memory having at least one command/address pin according to another embodiment of the present invention. In step S111, a target command to be provided to the memory through the at least one command/address pins is generated. In step S112, it is determined whether the target command is directly followed by a NOP command. When a determination result of step S112 is affirmative, step S113 is performed to delay a transition time for stopping transmitting the target command through the at least one command/address pin. Conversely, when the determination result of step S112 is negative, step S114 is performed to maintain the original transition time.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for managing a memory having a plurality of command/address pins, comprising:
   a command generating module, configured to generate a set of target commands, the set of target commands comprising a plurality of command groups, each of the command groups corresponding to at least one command/address pin of the plurality of command/address pins, the memory accessing the set of target commands from the plurality of command/address pins at a target time point; and
   a control module, configured to control the command groups to respectively transition at different time points prior to the target time point.

2. The apparatus according to claim 1, wherein the control module further determines whether the set of target commands directly follow a no-operation (NOP) command.

3. The apparatus according to claim 1, wherein the plurality of command groups are predetermined according to physical address configuration of the plurality of command/address pins.

* * * * *